US006574877B2

(12) United States Patent
Gray et al.

(10) Patent No.: US 6,574,877 B2
(45) Date of Patent: Jun. 10, 2003

(54) TWO PIECE ALIGNMENT HEAD

(75) Inventors: Brian K. Gray, Conway, AR (US); M. Todd Foreman, Greenbrier, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/681,616

(22) Filed: May 9, 2001

(65) Prior Publication Data

US 2002/0095802 A1 Jul. 25, 2002

Related U.S. Application Data

(60) Provisional application No. 60/223,971, filed on Aug. 9, 2000.

(51) Int. Cl.$^7$ .............................. G01B 11/275
(52) U.S. Cl. .................. 33/203.18; 33/288; 33/DIG. 21
(58) Field of Search ................... 33/203.18, 203.19, 33/203.2, 203, 286, 288, DIG. 21

(56) References Cited

U.S. PATENT DOCUMENTS

| | | | |
|---|---|---|---|
| 3,913,236 A | * | 10/1975 | Butler ................. 33/203.18 |
| 4,130,362 A | | 12/1978 | Lill et al. |
| 4,180,326 A | | 12/1979 | Chang |
| 4,184,071 A | | 1/1980 | Fryer et al. |
| 4,283,129 A | | 8/1981 | Bennick, Jr. |
| 4,408,879 A | | 10/1983 | Ragan |
| 4,574,490 A | | 3/1986 | Curchod |
| 4,594,789 A | * | 6/1986 | Marino et al. ........... 33/203.18 |
| 4,672,818 A | | 6/1987 | Roth |
| 4,718,759 A | * | 1/1988 | Butler ................. 33/203.18 |
| 4,761,749 A | | 8/1988 | Titsworth et al. |
| 4,931,964 A | | 6/1990 | Titsworth et al. |
| 5,140,374 A | | 8/1992 | Jagielski et al. |
| 5,168,632 A | | 12/1992 | Rimlinger, Jr. |
| 5,283,915 A | | 2/1994 | Idland et al. |
| 5,304,579 A | | 4/1994 | Hara et al. |
| 5,313,711 A | | 5/1994 | Kling, III et al. |
| 5,488,471 A | | 1/1996 | McClenahan et al. |
| 5,488,472 A | | 1/1996 | January |
| 5,489,979 A | * | 2/1996 | Corghi .................. 33/286 |
| 5,505,000 A | * | 4/1996 | Cooke ................ 33/203.15 |
| 5,531,030 A | | 7/1996 | Dale, Jr. |

(List continued on next page.)

OTHER PUBLICATIONS

Hunter Engineering Co. Product Literature Form No. 4517T, "DSP250 & 300 Series Sensors", dates Feb., 2000, 6 pages.
Hunter Engineering Co. Product Literature Form No. 4057T, "DSP300 Series Wheel Alignment Sensors –Operation Instructions", dated Nov. 1998, select pages.
Hunter Engineering Co. Product Literature Form No. 4058T, "DSP300 Series Sensor Service Manual", dated Aug., 1998, select pages.
Hunter Engineering Co. Product Literature Form No. 4–87, "DSP306/308 Sensor Assembly", dated Sep., 1997, 13 pages.
Hunter Engineering Co. Product Literature Form No. 3587T, "DSP Sensor Service Manual", dated Jul. 1994, select pages.
Hunter Engineering Co. Product Literature Form No. 3362T, "System M11 Hand Held Wheel Alignment Systems", dated Jun. 1993, 6 pages.

*Primary Examiner*—Diego Gutierrez
*Assistant Examiner*—Amy R. Cohen
(74) *Attorney, Agent, or Firm*—McDermott, Will & Emery

(57) ABSTRACT

An alignment head for use in aligning the wheels of a vehicle. The alignment head includes left and right covers configured for engaging each other to establish a housing. A frame assembly is positioned within a central portion of the housing, and sensors are mounted on the frame assembly. First and second transceivers are positioned respectively within front and rear portions of the housing. The sensors and transceivers provide information that is used by certain control circuitry to generate alignment information that can be used to align the wheels of the vehicle.

21 Claims, 7 Drawing Sheets

U.S. PATENT DOCUMENTS

| | | |
|---|---|---|
| 5,592,383 A | 1/1997 | Rogers et al. |
| 5,648,846 A * | 7/1997 | Douine et al. ............ 33/203.18 |
| 5,695,699 A | 12/1997 | Naritomi |
| 5,731,870 A | 3/1998 | Bartko et al. |
| 5,760,938 A | 6/1998 | Hodge |
| 5,767,767 A * | 6/1998 | Lima et al. .................... 33/203 |
| 5,786,751 A | 7/1998 | Robby |
| 5,811,039 A | 9/1998 | Addeo et al. |
| 6,085,428 A | 7/2000 | Casby et al. |

* cited by examiner

TWO PIECE ALIGNMENT HEAD

CROSS REFERENCE TO RELATED APPLICATION

This application claims benefit of U.S. Provisional Application No. 60/223,971 entitled "Two Piece Alignment Head" filed on Aug. 9, 2000, the contents of which are incorporated by reference herein.

BACKGROUND OF THE INVENTION

1. Technical Field

The present invention relates to automotive wheel alignment and, more particularly, to an alignment head for use with wheel alignment systems.

2. Description of the Related Art

Automotive wheel alignment heads mount to the wheels of an automobile for determination of wheel alignment. These alignment heads are pervasive in automobile repair facilities. Modern automotive wheel alignment heads are complex and include numerous parts that must be assembled into one unit. Such systems, however, require longer assembly times and are subject to increased costs. FIGS. 7A and 7B are perspective views of a conventional alignment head 300. The alignment head 300 includes a main body 310 that is used to house a track toe sensor (not shown). A cover 312 is disposed over the main body 310. A tube 314 is coupled at one end to the main body 310, and extends therefrom. A cross toe sensor module 316 is mounted on the opposite end of the tube 314. The cross toe sensor module 316 houses a cross toe sensor (not shown). A second cover 318 is provided to cover the cross toe sensor module 316 and the cross toe sensor.

Conventional alignment heads 300, such as the one illustrated in FIGS. 7A and 7B, suffer from various drawbacks. For example, the numerous components must be assembled using conventional fasteners or other connection methods. The components also must be assembled with substantial precision. In order to properly align the wheels of a vehicle, it is crucial that all the components remain in their designated orientations. During normal operations, however, it is common for alignment heads to fall or otherwise experience impacts that cause these components to deviate from their designated orientations. Consequently, the vehicle wheels cannot be properly aligned until the alignment head is repaired to its original specification.

The components must also be manufactured to close tolerances in order to allow control software to compensate for discrepancies. For example, the main body 310 and other components can be manufactured using various processes such as sand casting and die casting. These components must then be subjected to numerous machining operations in order to achieve the tolerances required to perform proper wheel alignment and calibration of the alignment head 300. These operations significantly increase the manufacturing cost of the alignment head 300.

Conventional alignment heads 300 also require systems for calibrating (i.e., leveling) the alignment head 300. Typically, a plurality of steel, or lead, weights are disposed within the alignment head 300. When components are moved from their designated orientations, the alignment head 300 must be recalibrated. This requires that weights be added or removed to relevel the alignment head 300. Recalibration of the alignment head 300 can be difficult and time consuming because the alignment head 300 must be disassembled and weights of appropriate mass must be selected and installed to level the alignment head 300.

Another problem associated with conventional alignment heads 300 is the manner in which the alignment head 300 is locked when a caster sweep must be performed. Specifically, conventional alignment heads 300 utilize a locking knob 320 that engages a central shaft of the alignment head 300 downwardly from the top portion of the alignment head 300. This can result in camber shift during the alignment process.

Accordingly, there exists a need for an alignment head having internal components that cannot be moved easily from their designated orientations. There also exits a need for an alignment head that can be manufactured cost-effectively. There exists a further need for an alignment head that can be easily leveled once attached to the wheel of a vehicle.

SUMMARY OF THE INVENTION

An advantage of the present invention is the ability to provide an alignment head having internal components mounted such that they cannot be easily moved from their designated orientations as a result of impact or repeated use. Another advantage of the present invention is an alignment head that does not require high-precision machining operations to construct, hence reducing the overall manufacturing cost. Yet another advantage of the present invention is an alignment head that can be easily leveled and calibrated once attached to the wheel of a vehicle.

These and other problems are addressed by the present invention wherein an alignment head includes a two piece housing within which sensors and transceivers are disposed.

According to one aspect of the present invention, an alignment head comprises a housing, a frame assembly, at least one sensor, a pair of transceivers, and control circuitry disposed therein. The housing is in the form of a left and right cover that are adapted for engagement with each other. Additionally, the housing has a front portion, a rear portion, and a central portion. The frame assembly is positioned within the central portion of the housing, and the sensor is mounted on the frame assembly. The first transceiver is positioned within the front portion of the housing, while the second transceiver is positioned within the rear portion of the housing. The sensor is used to generate data indicative of the orientation of the alignment head. The first and second transceivers are used to transmit and receive alignment signals. The control circuitry receives data from the sensors and alignment signals from the first and second transceivers. The control circuitry utilizes this information to generate alignment information that can be used to align the wheels of the vehicle. According to such an arrangement, all the components of the alignment head can be internally disposed within one housing. Further, the housing is constructed with sufficient rigidity to withstand impacts without disturbing the orientation of the internal components.

According to another aspect of the present invention, a subassembly is provided within the rear portion of the housing for storing a power supply unit. The power supply unit can be in the form of conventional circuitry for receiving either direct current (DC) or alternating current (AC) from an external source. Alternatively, the power supply unit can be in the form of either rechargeable or conventional batteries. Such an arrangement provides a technician with flexibility in selecting locations wherein wheel alignments can be performed.

According to another aspect of the present invention, the frame assembly includes a pair of skeletal plates respectively positioned within the left and right covers of the housing. An extrusion member having a passage therethrough is positioned between the two skeletal plates. Additionally, a shaft is positioned within the passage and extends from the left cover to the right cover of the housing. According to such an arrangement, the housing is structurally reinforced, and the sensor can be efficiently positioned.

Additional advantages and novel features of the present invention will be set forth in part in the description which follows, and in part will become apparent to those skilled in the art upon examination of the following, or may be learned by practice of the present invention. The embodiments shown and described provide an illustration of the best mode contemplated for carrying out the present invention. The invention is capable of modifications in various obvious respects, all without departing from the spirit and scope thereof. Accordingly, the drawings and description are to be regarded as illustrative in nature, and not as restrictive. The advantages of the present invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

DETAILED DESCRIPTION

The present invention addresses some of the shortcomings of the prior art by providing a split shell design that incorporates all the structures of a conventional alignment head. Such a design reduces the number of parts, hence simplifying assembly and reducing overall costs. Furthermore, such a structure is rigid and capable of withstanding harsh operating conditions that would otherwise bring the sensors and transceivers outside the calibration range available to the control circuitry and related software.

Figure 1:
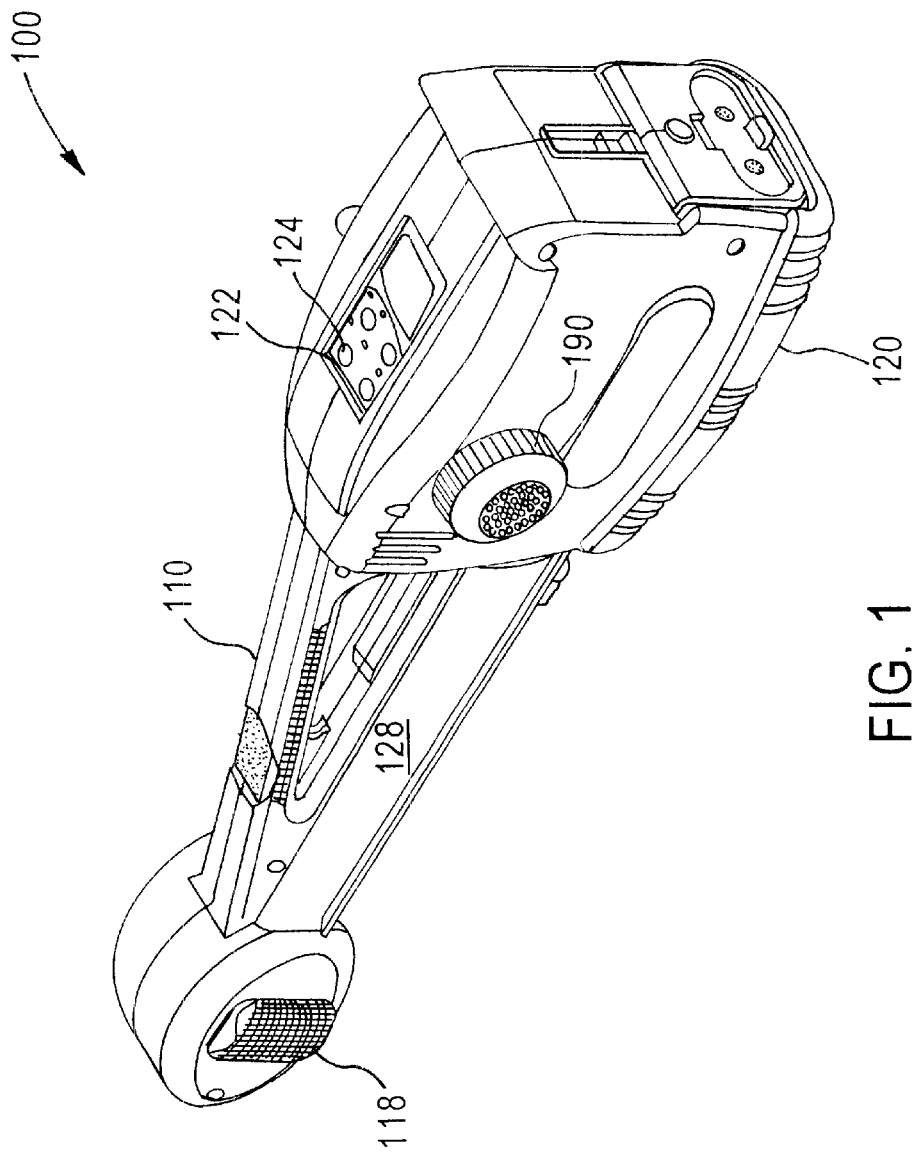
FIG. 1 is perspective side elevational view of an alignment head constructed in accordance with the present invention.
Figure 2:
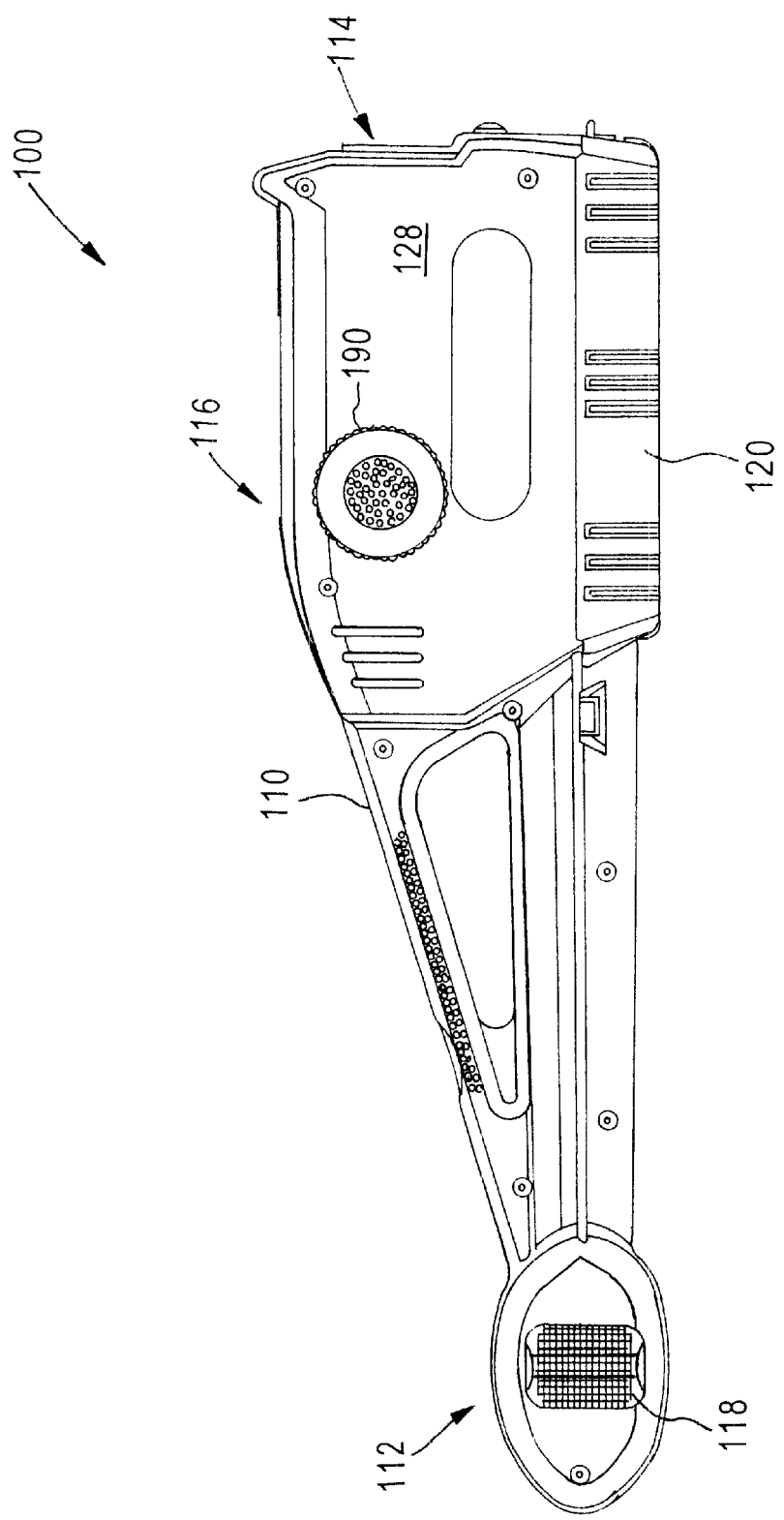
FIG. 2 is a side elevational view of the alignment head.
Figure 3:
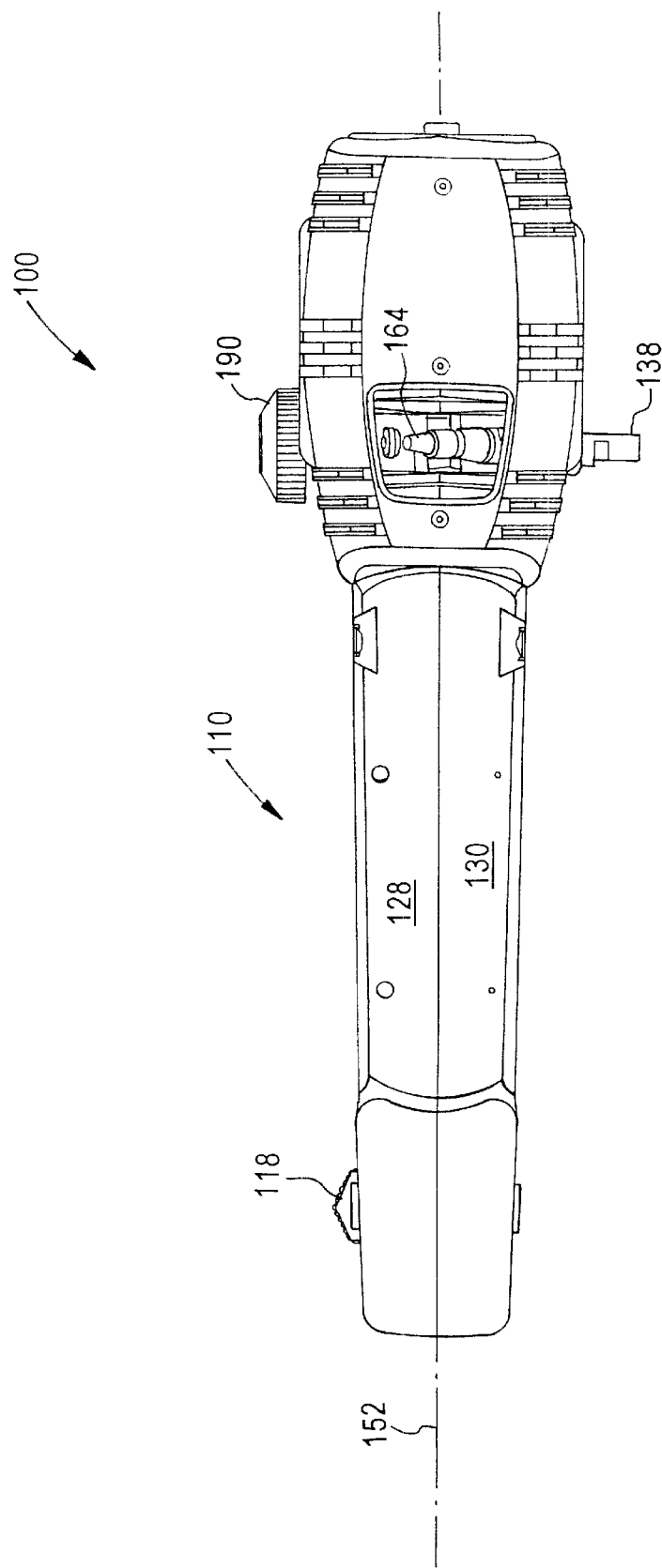
FIG. 3 is a bottom plan view of the alignment head.

Referring to the Figures, and initially to FIGS. 1–3, there is shown an alignment head 100 constructed in accordance with the present invention. The alignment head 100 includes a housing 110 that has a hollow interior and is capable of securely receiving all the components necessary for performing an alignment procedure. The housing 110 can be constructed from various materials, such as structural foam or plastic, using economical molding processes. The housing 110 includes a front portion 112, a rear portion 114, and a central portion 116. As illustrated in FIGS. 1 and 2, a front bumper 118 is attached to the side of the front portion 112. Additionally, a main bumper 120 is attached to the bottom of the housing 110 and extends from the central portion 116 to the rear portion 114.

According to the disclosed embodiment of the invention, the alignment head 100 can be provided with a user interface 122 disposed on a top surface of the housing 110. The user interface 122 includes a keypad 124. During alignment procedures, an operator can input information and/or select menu items using the keypad 124. Accordingly, the keypad 124 can include a plurality of keys sufficient for both entering letters and numbers, as well navigating through the menus. According to alternative embodiments of the invention, the alignment head 100 does not require a user interface 122. Rather, information is entered and displayed externally using, for example, an external control system (not shown) that can include a CRT display unit coupled to a keyboard, or Personal Computer (not shown) executing software for performing the alignment.

Figure 4:
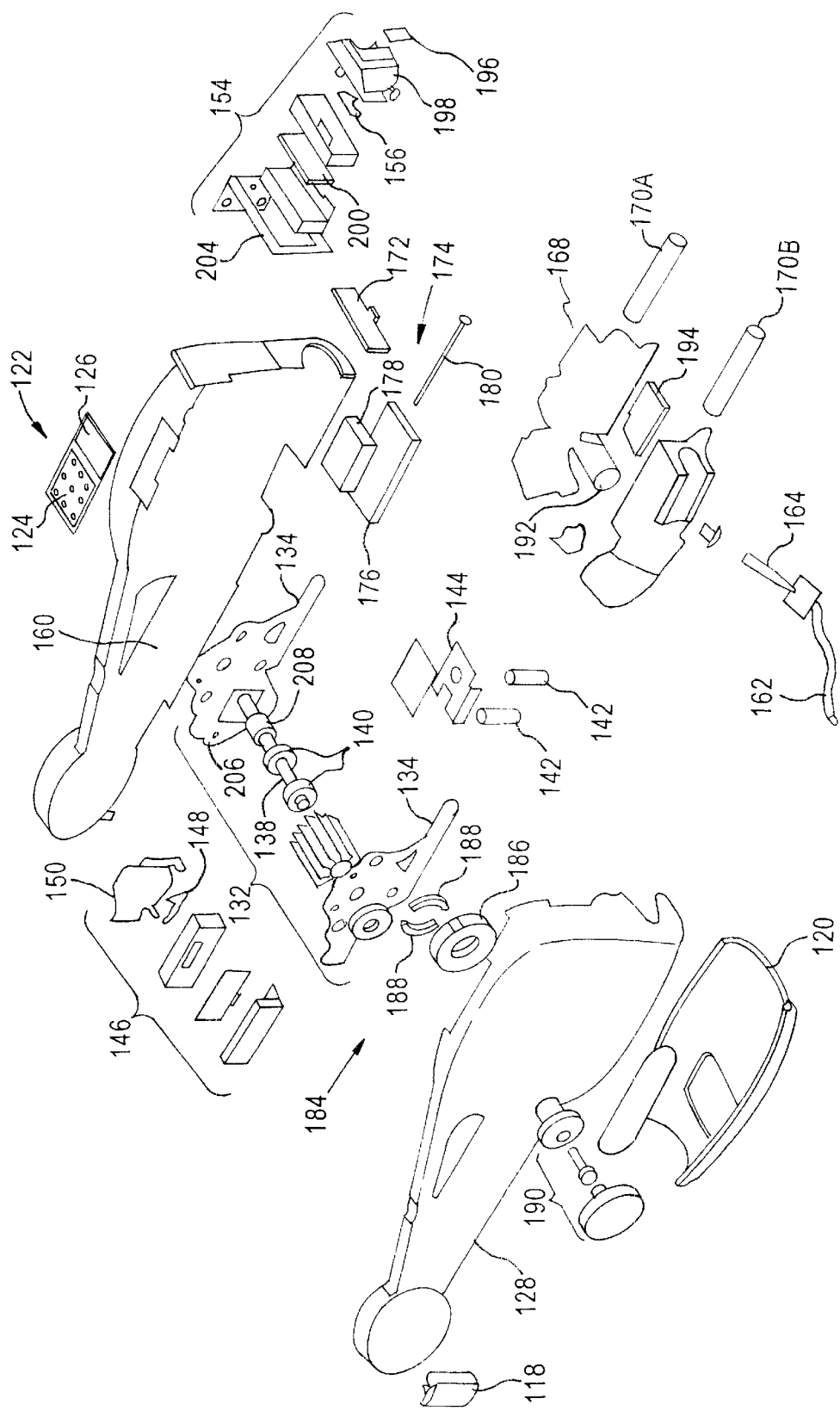
FIG. 4 is a perspective exploded view of the alignment head.

With continued reference to FIG. 1 and additional reference to FIG. 4, the housing 110 is shown to be in the form of a left cover 128 and a right cover 130. The left and right covers 128, 130 are adapted for engagement with each other using mating components, as is well known in the art, to form the housing 110. In addition to the use of mating components, various fasteners can be used to secure the left cover 128 to the right cover 130. The interior of the housing 110 includes various moldings designed to retain securely a plurality of components when the left cover 128 and right cover 130 are attached to each other. According to such a feature, the components are not displaced if the alignment head 100 is subject to impact.

As illustrated in FIG. 4, a frame assembly 132 is positioned within the central portion of the housing 110. The frame assembly 132 includes a pair of skeletal plates 134 attached, one each, to the left and right covers 128, 130. The skeletal plates 134 help reinforce the housing's structural rigidity, and can be constructed from a number of high strength materials such metals, metal alloys, and composites. The skeletal plates 134 are preferably manufactured from aluminum or composites in order to provide sufficient strength without adding unnecessary weight to the alignment head 100. The skeletal plates 134 also include various cutouts, or apertures, that facilitate secure placement within the molded interior of the left and right covers 128, 130. The frame assembly 132 includes an extrusion member 136 positioned between the two skeletal plates 134. The extrusion member 136 has a hollow exterior defining a passage. Furthermore, a shaft 138 extends through the passage. The shaft 138 also extends from the left cover 128 to the right cover 130.

Figure 5:
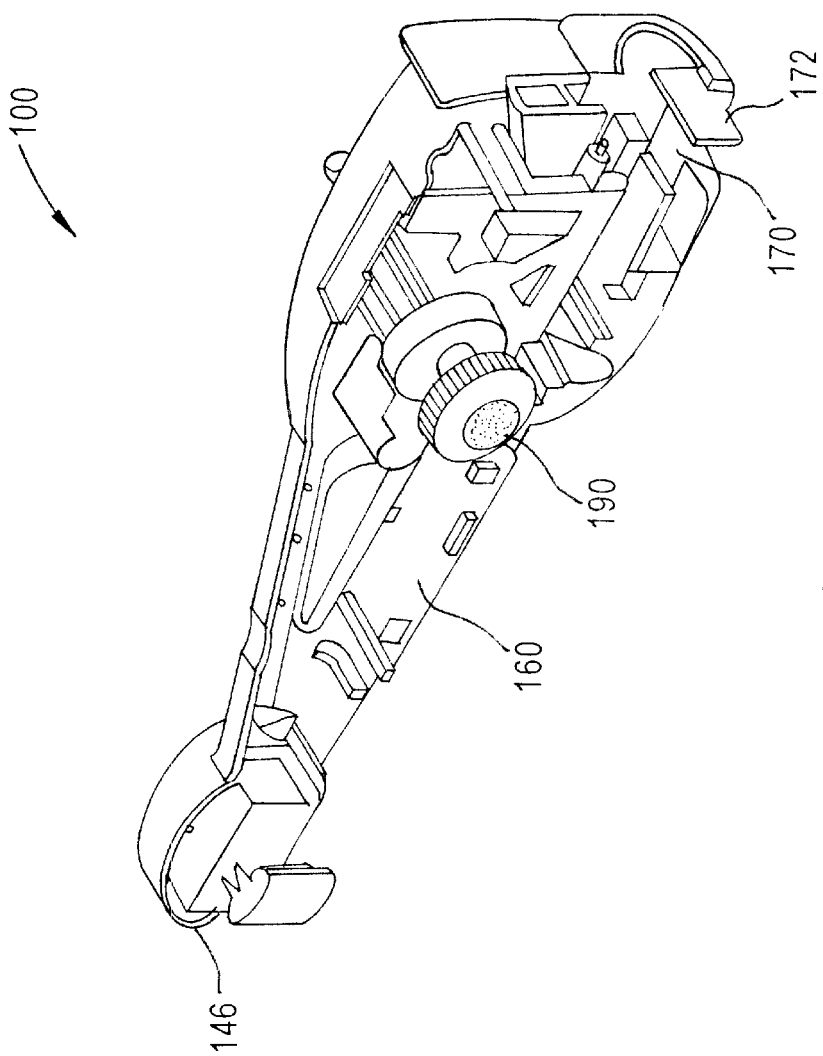
FIG. 5 is a perspective cutaway view of the alignment head.

According to the disclosed embodiment of the invention, a pair of bearing assemblies 140 is also positioned within the passage of the extrusion member 136. Sensors 142, such as inclinometers, are provided to generate data indicative of the orientation of the alignment head 100. More particularly, the sensors 142 can be in the form of a caster inclinometer and steering axis inclinometer disposed in the central portion 116 of the housing 110. As illustrated in FIGS. 4 and 5, a mounting bracket 144 is coupled to the frame assembly 132 to support the sensors 142. As is well known, the caster and steering axis inclinometer are used to provide signals useable in the calculation of toe, caster, and camber angles of the vehicle wheels.

A first transceiver 146, such as a cross toe sensor, is disposed in the front portion 112 of the housing 110. The first transceiver 146 includes a light emitting diode (LED) array 148 which contains one or more LEDs, and an optical receiver 150 such as a charge-coupled device (CCD) or CMOS unit. The LED array 148 projects a beam of light along a first prescribed direction. As is well known in the art, the first prescribed direction corresponds to a direction perpendicular to a central axis 152 of the alignment head 100. Further, the projected beam is directed toward a second alignment head (not shown) positioned on a wheel across from the alignment head. The optical receiver 150 is oriented such that it receives a beam of light transmitted along the first prescribed axis. Typically, the optical receiver 150 receives the beam of light from the second alignment head.

A second transceiver 154, such as a track toe sensor, is disposed in the rear portion 114 of the housing 110. The second transceiver 154 includes a second LED array 156 which contains one or more LEDs, and a second optical receiver 158. As with the first transceiver 146, the second optical receiver 158 can also be in the form of a CCD or CMOS unit. The second LED array 156 projects a second beam of light along a second prescribed direction to observe the track of the vehicle. The second prescribed direction corresponds to a direction parallel to the central axis 152 of the alignment head 100. Further, the second projected beam is directed toward a third alignment head (not shown) positioned on a wheel aft of the alignment head 100. The second optical receiver 158 is oriented such that it receives a beam of light transmitted along the second prescribed axis. Typically, the second optical receiver 158 receives the beam of light from the third alignment head.

Referring to FIGS. 4 and 5, the alignment head 100 includes control circuitry 160 that receives data from the sensors 142 and signals from the transceivers 146, 154. The control circuitry 160 subsequently generates alignment information that is used in aligning the wheels of the vehicle. The control circuitry 160 can be in the form of a single printed circuit board that is electrically coupled to the sensors 142 and transceivers 146, 154. Alternatively, the sensors 142 and transceivers 146, 154 can each include specialized printed circuit boards that are coupled to a main circuit board for exchanging data and signals. The alignment information generated by the control circuitry 160 is transmitted to a wheel alignment system or external control system (not shown) that can include, for example, a personal computer. According to one embodiment of the invention, information is transferred between the alignment head 100 and the alignment system by means of a cable. For example, the alignment head 100 can be provided with a connector 164 that is configured for engaging the cable 162 and transmitting data to the alignment system. As is well known in the art, such cable/connector combinations can be designed to include one or more wires that carry various signals or power. Alternatively, the alignment head 100 can be provided with a radio frequency (RF) module 166 that transmits and receives data between the alignment head 100 and the wheel alignment system. Such an embodiment advantageously eliminates the need for a plurality of cables 162 and simplifies the set-up and operation of the alignment head 100 during wheel alignment processes.

The alignment head 100 includes a sub-assembly 168 disposed within the rear portion 114 of the housing 110. The sub-assembly 168 is used to house a power supply unit 170 that provides power to the alignment head 100. The sub-assembly 168 can also be used to house various components such as the RF module 166 and the connector 164. According to the disclosed embodiment of the invention, the alignment head 100 can be powered using either an external power supply source or an internal power supply unit 170. The power supply unit 170 is preferably in the form of batteries 170A, 170B disposed within the sub-assembly 168. Such an arrangement advantageously improves portability of the alignment head 100 and helps the facilitate wireless operation.

In certain embodiments of the invention, the power supply can be in the form of rechargeable batteries. For example, various types of cordless tools are now powered by rechargeable batteries such as the VERSA-PACK type batteries manufactured and sold by BLACK AND DECKER. The use of such batteries allows interoperability and exchange between various other cordless tools available to the user. Additionally, extra batteries can be purchased and recharged while the alignment head 100 is being used. When the batteries within the alignment head 100 run out of power, they can be immediately replaced without any down-time. A sliding door 172 is used to provides access to the batteries.

The alignment head 100 also includes a leveling mechanism 174 that is operatively coupled to the sensors 142. The leveling mechanism 174 provides an easy and efficient manner of leveling and adjusting the sensors 142 when the alignment head 100 is mounted to the wheel of the vehicle. The leveling mechanism 174 includes a counterweight bracket 176 that is secured to the frame assembly 132. A counterweight 178 is movably secured to the counterweight bracket 176 in order to provide the necessary level of alignment head 100. An adjusting mechanism 180 is operatively coupled to the counterweight 178 in order to move the counterweight 178 along the counterweight bracket 180. As the adjusting mechanism 180 moves the counterweight 178, the alignment head 100 can be fine-tuned until it is properly leveled. According to the disclosed embodiment of the invention, the adjustment mechanism 180 is the form of an adjustment screw. Further, an aperture can be provided in the backing plate 172 so that an operator can insert an appropriate tool, such as a screwdriver, to adjust the position of the counterweight 178.

Figure 6:
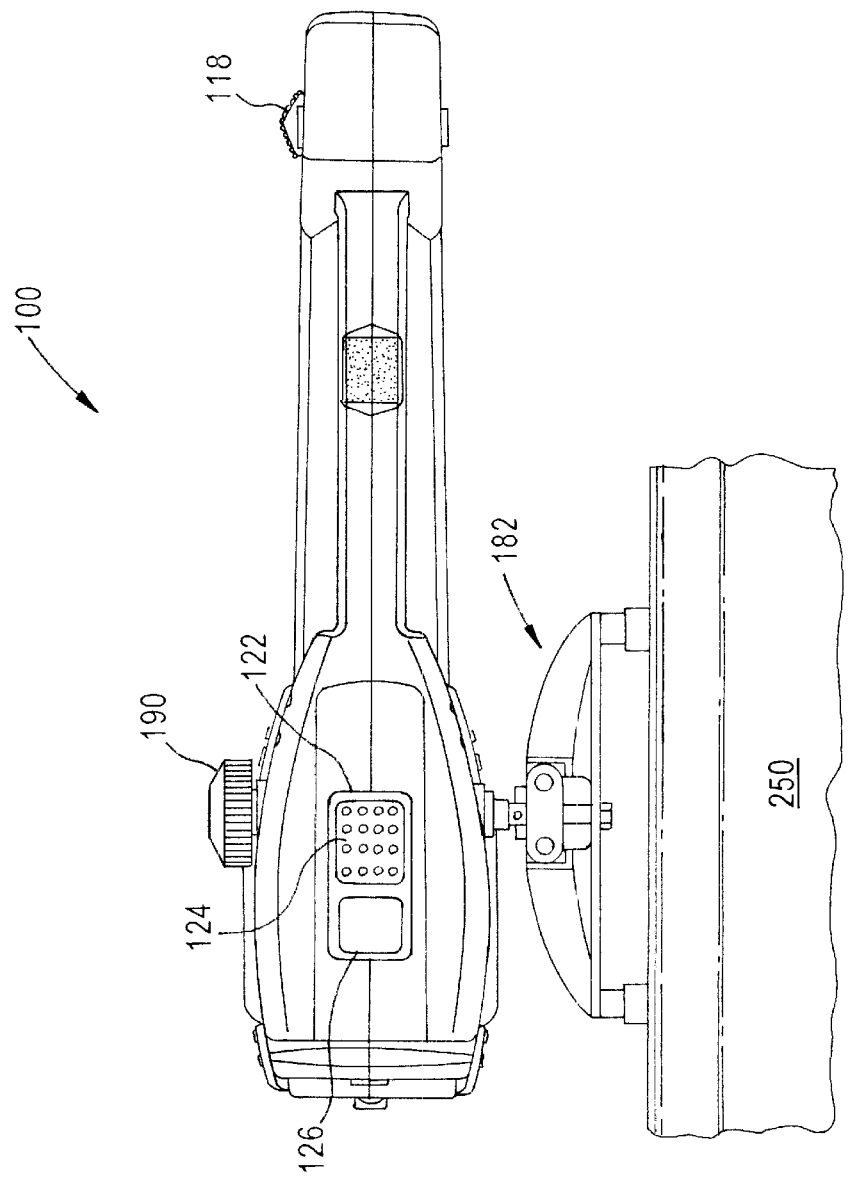
FIG. 6 is a top plan view of the alignment head mounted to a vehicle wheel.
Figure 7B:
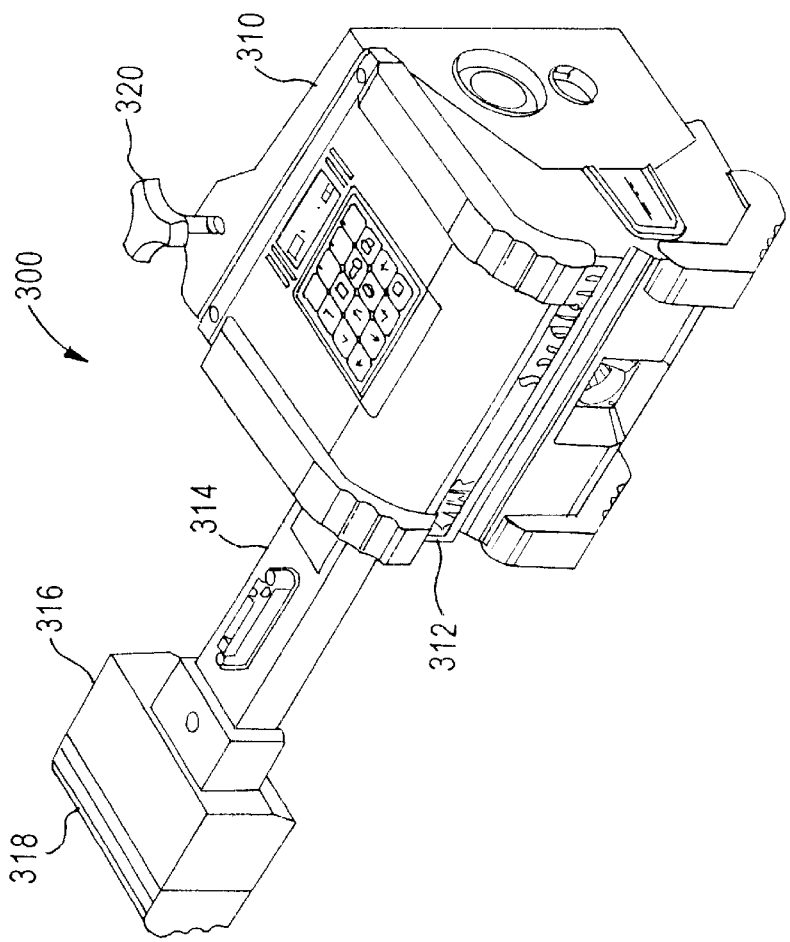
FIG. 7B is a perspective right side elevational view of a conventional alignment head.
Figure 7A:
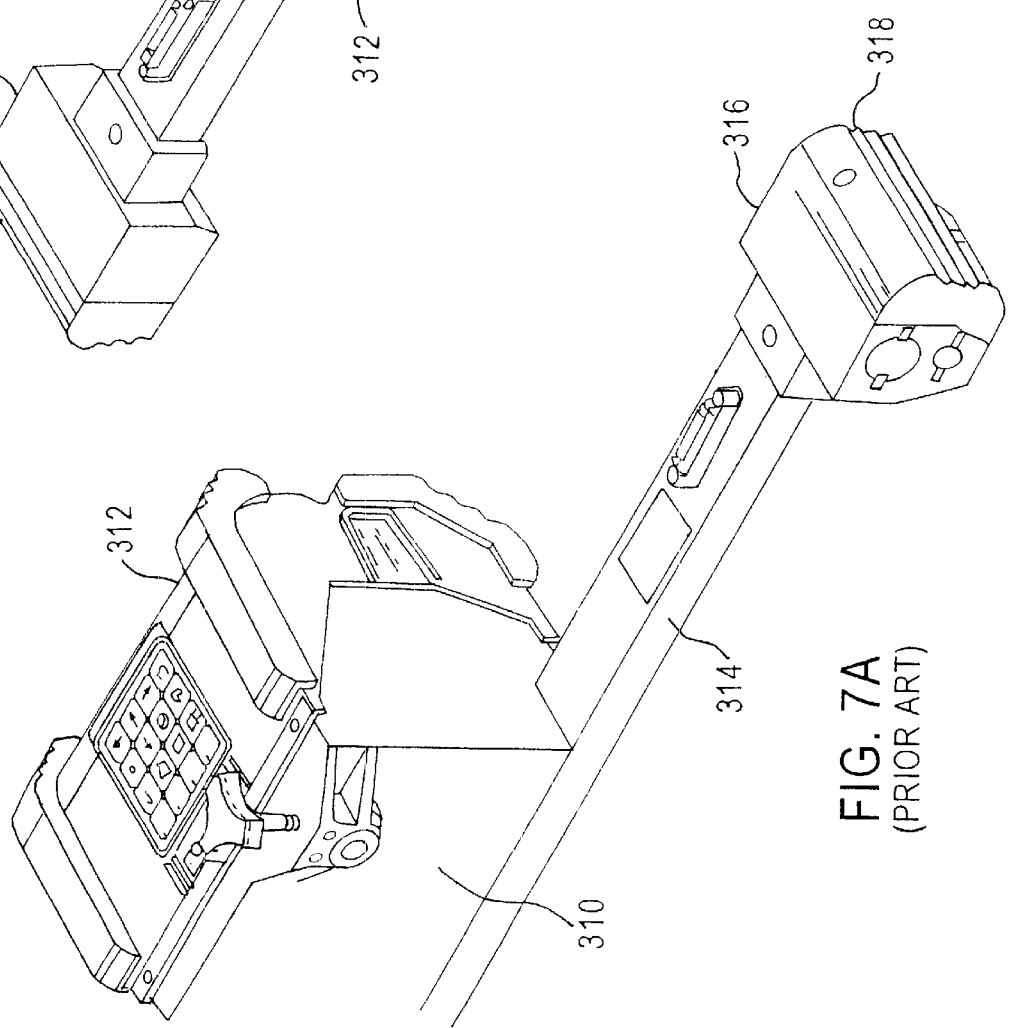
FIG. 7A is a perspective left side elevational view of a conventional alignment head.

Referring additionally to FIG. 6, a wheel support mechanism 182 can be coupled to the alignment head 100 in order to mount the alignment head 100 on the vehicle wheel 250. Such wheel support mechanisms 182 are well known and, accordingly, will not be described in detail. In brief, the wheel support mechanism is immovably attached to the wheel 250 and coupled to the alignment head 100. A locking mechanism 184 (FIG. 4) is provided for securing the alignment head 100 to the wheel support mechanism 182, thereby preventing rotation of alignment head 100 with respect to locking mechanism 184. According to one embodiment of the invention, the locking mechanism 184 includes a brake collar 186 and one or more brakes 188 that are mounted on the shaft 138.

A knob assembly 190 is operatively coupled to the brake collar 186 and protrudes externally of the housing 110. The locking mechanism 184 is configured such that by turning the knob assembly 190 in the appropriate direction, the brake collar 186 controls operation of the brakes 188. For example, this can be accomplished by providing the brake collar 186 with a predetermined design taper such that by turning the knob assembly 190 in a first direction, the brake collar 186 forces the brakes 188 to exert pressure on the shaft 138, thereby preventing the alignment head 100 from moving. Similarly, by turning the knob assembly 190 in a second direction, the force is relieved from the brakes 188 to allow movement of the alignment head 100. The particular arrangement of the knob assembly 190 eliminates camber and toe shift that is projected onto the shaft 138 by some conventional alignment heads because most of the forces are exerted along the centerline of the shaft 138.

The alignment head 100 of the present invention is designed such that the sensors 142 are centrally disposed along a center line of the alignment head 100. Additionally, the sensors 142 are positioned between the skeletal plates 134 of the frame assembly 132. Such an arrangement advantageously protects the sensors 142 from shock and misalignment. As illustrated in the Figures, the transceivers 146, 154 are positioned within molded portions of the housing 110. Accordingly, the transceivers 146, 154 can be easily removed without having to disassemble other components of the alignment head 100.

One advantage of the present invention is that the particular construction of the calibration mechanism 174 also allows complete manufacture and assembly of the alignment head 100 prior to final leveling. Once assembled, the alignment head 100 is placed in a working environment and the adjustment mechanism 180 used to fine tune level of the alignment head 100. Such an arrangement digresses from conventional arrangements that utilize a plurality of weights disposed within the alignment head. One problem with such arrangements is that when the sensors must be calibrated, the alignment head must be opened and various counter-weights must be added or replaced. In contrast, the present alignment head 100 eliminates the need to open the housing 110 to add or replace weights. Rather, the adjusting mechanism can be used to vary the position of the counterweight to place the sensors in a level position.

As shown in FIG. 4, the present alignment head includes various additional components that are disposed in the housing 110. These components include a battery interface printed circuit board (PCB) 192, an RF PCB 194, filters 196, a CCD front cover 198, a CCD PCB 200, a CCD rear cover 202, a CCD bracket 204, a "Y" washer 206, and a gap plug shaft 208. These components are used only to illustrate the construction and assembly of one specific embodiment of the present invention. Various ones of these components can be eliminated depending on the desired configuration.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the present invention.

Only the preferred embodiment of the invention and an example of its versatility are shown and described in the present disclosure. It is to be understood that the invention is capable of use in various other combinations and environments and is capable of changes or modifications within the scope of the inventive concept as expressed herein.

What is claimed is:

1. An alignment head for aligning the wheels of a vehicle, comprising:
    a housing including a left cover and a right cover adapted for engagement with each other;
    said housing having a front portion, a rear portion, and a central portion;
    a frame assembly disposed within the central portion of said housing;
    at least one sensor mounted on said frame assembly for generating data indicative of an orientation of said alignment head;
    a first transceiver disposed within the front portion of said housing for transmitting and receiving alignment signals;
    a second transceiver disposed within the rear portion of said housing for transmitting and receiving alignment signals; and
    control circuitry for receiving data from said at least one sensor and alignment signals from said first and second transceivers, and generating alignment information useable in aligning the wheels of the vehicle.

2. The alignment head of claim 1, further comprising a connector for exchanging information with an external control system.

3. The alignment head of claim 1, further comprising a radio frequency (RF) module for exchanging information with an external control system.

4. The alignment head of claim 1, wherein said at least one sensor comprises at least one inclinometer.

5. The alignment head of claim 1, wherein said frame assembly comprises:
    a first skeletal plate disposed within the left cover of said housing;
    a second skeletal plate disposed within the right cover of said housing;
    an extrusion member positioned between said first and second skeletal plates and having a passage therethrough; and
    a shaft disposed within the central portion of said housing and within the passage of said extrusion, said shaft extending from the left cover of said housing to the right cover of said housing.

6. The alignment head of claim 1, further comprising:
    a subassembly disposed within the rear portion of said housing; and
    a power supply unit disposed within said subassembly for supplying power to said alignment head.

7. The alignment head of claim 6, wherein said power supply unit comprises at least one rechargeable battery.

8. The alignment head of claim 7, wherein said subassembly includes a sliding door for providing access to said at least one rechargeable battery for ease of replacement during operation.

9. The alignment head of claim 1, further comprising a calibration mechanism operatively coupled to said at least one sensor.

10. The alignment head of claim 9, wherein said calibration mechanism comprises:
    a counterweight bracket secured to said frame assembly,
    a counterweight movably secured to said counterweight bracket, and
    an adjusting mechanism operatively coupled to said counterweight for moving said counterweight to calibrate said at least one sensor.

11. The alignment head of claim 10, wherein said adjusting mechanism comprises an adjustment screw.

12. The alignment head of claim 1, wherein said first transceiver comprises:
    a light emitting diode (LED) array for emitting an optical signal in a first prescribed direction; and
    an optical receiver for receiving a second optical signal along said first prescribed direction.

13. The alignment head of claim 12, wherein said optical receiver comprises a charge-coupled device (CCD) or CMOS array.

14. The alignment head of claim 1, wherein said second transceiver comprises:
    a second light emitting diode (LED) array for emitting a third optical signal in a second prescribed direction; and
    a second optical receiver for receiving a fourth optical signal along said second prescribed direction.

15. The alignment head of claim 14, wherein said second optical receiver comprises a CCD or CMOS array.

16. The alignment head of claim 1, further comprising a user interface for inputting and displaying information to and from said alignment head.

17. The alignment head of claim 16, wherein said user interface includes a keypad.

18. The alignment head of claim 1, further comprising a wheel support mechanism for mounting said alignment head to the wheel of the vehicle.

19. The alignment head of claim 18, further comprising a locking mechanism for securing said alignment head to said wheel support mechanism.

20. An alignment head for aligning the wheels of a vehicle, comprising:

a housing including a left cover and a right cover adapted for engagement with each other;

a frame assembly disposed within said housing;

at least one sensor mounted on said frame assembly for generating data indicative of an orientation of said alignment head;

at least one transceiver disposed within said housing for transmitting and receiving alignment signals; and control circuitry for receiving data from said at least one sensor and alignment signals from said at least one transceiver, and generating alignment information useable in aligning the wheels of the vehicle.

21. An alignment head for aligning the wheels of a vehicle, comprising:

a housing including a left cover and a right cover adapted for engagement with each other;

at least one sensor disposed within said housing for generating data indicative of an orientation of said alignment head;

at least one transceiver disposed within said housing for transmitting and receiving alignment signals; and control circuitry for receiving data from said at least one sensor and alignment signals from said at least one transceiver, and generating alignment information useable in aligning the wheels of the vehicle.

* * * * *